United States Patent [19]

Girerd

[11] Patent Number: 4,936,733
[45] Date of Patent: Jun. 26, 1990

[54] ROLL-ON, ROLL-OFF HANDLING DEVICE AND ELEMENT FOR CONTAINERS OR THE LIKE

[75] Inventor: Marc Girerd, Ladon, France
[73] Assignee: Toutenkamion, Ladon, France
[21] Appl. No.: 360,202
[22] Filed: Jun. 1, 1989

Related U.S. Application Data

[63] Continuation-in-part of Ser. No. 141,362, Dec. 14, 1987, Pat. No. 4,863,334.

[30] Foreign Application Priority Data

Apr. 24, 1986 [FR] France .................. 86 05968

[51] Int. Cl.$^5$ .............................................. B60P 3/40
[52] U.S. Cl. .................................... 414/458; 414/498
[58] Field of Search ............... 414/458, 494, 495, 497, 414/498; 280/35; 254/8 R, 45, 124

[56] References Cited

U.S. PATENT DOCUMENTS

| | | | |
|---|---|---|---|
| 3,243,193 | 3/1966 | Fulmer et al. | 414/458 X |
| 3,497,231 | 2/1970 | Fulmer et al. | |
| 3,631,999 | 1/1972 | Walerowski | 414/458 |
| 3,795,336 | 3/1974 | Acker et al. | 414/458 |
| 3,834,111 | 9/1974 | Acker et al. | |
| 4,348,149 | 9/1982 | Deamer | 414/458 |
| 4,458,786 | 7/1984 | Lébre | 280/35 |
| 4,530,411 | 7/1985 | Grinwald | 280/35 X |
| 4,570,959 | 2/1986 | Grinwald | 414/458 X |

FOREIGN PATENT DOCUMENTS

| | | | |
|---|---|---|---|
| 2154619 | 5/1973 | Fed. Rep. of Germany | 414/458 |
| 1459243 | 11/1966 | France . | |
| 2109109 | 5/1972 | France . | |
| 1220961 | 3/1986 | U.S.S.R. | 414/458 |

OTHER PUBLICATIONS

"Train TMTS 10", *LOHR pamphlet*, Ref. 1435, F000 28 886.
"Mise au sol RMTS 10", *LOHR pamphlet*, Ref. 1439, F000 28 890.
"Mise au sol TCMTS 10", *LOHR pamphlet*, Ref. 1442, F000 28 896.

*Primary Examiner*—Robert J. Spar
*Assistant Examiner*—Robert S. Katz
*Attorney, Agent, or Firm*—Young & Thompson

[57] ABSTRACT

An improved roll-on, roll-off handling device is provided to lift one end of a container and to maintain it in the raised position during handling and displacement of the container, the device comprising a chassis; a wheel system for supporting the chassis upon the ground, the wheel system permits pivotal movement of the chassis with respect to the ground about a first axis parallel to the ground, the chassis pivoting about the first axis from a tilted position in which a first end of the chassis is adjacent to the ground and a raised position in which the first end is spaced from the ground; a carriage mounted on the chassis and displaceable along the longitudinal axis of the chassis, the longitudinal axis being transverse to the first axis; an apron removably attachable to one face of a container, the apron being connected to the carriage and adapted for pivotal movement with respect to both the carriage and the chassis about a second axis substantially parallel to the first axis; a connecting rod for pivotally displacing the apron with respect to the chassis about the second axis; a jack for moving the carriage and the chassis with respect to each other along the longitudinal axis of the chassis, the carriage being movable between an advanced carriage position in which the second axis is adjacent the first end of the chassis and spaced from the first axis, and a container supporting position in which the second axis is displaced toward an opposed second end of the chassis, thereby to allow movement of a container from a position in which the container rests on the ground with the chassis in its tilted position and the carriage in the advanced carriage position, to a position in which, after movement of the chassis to the raised position and of the carriage to its container supporting position, the end of the container is raised and overlies part of the chassis.

5 Claims, 12 Drawing Sheets

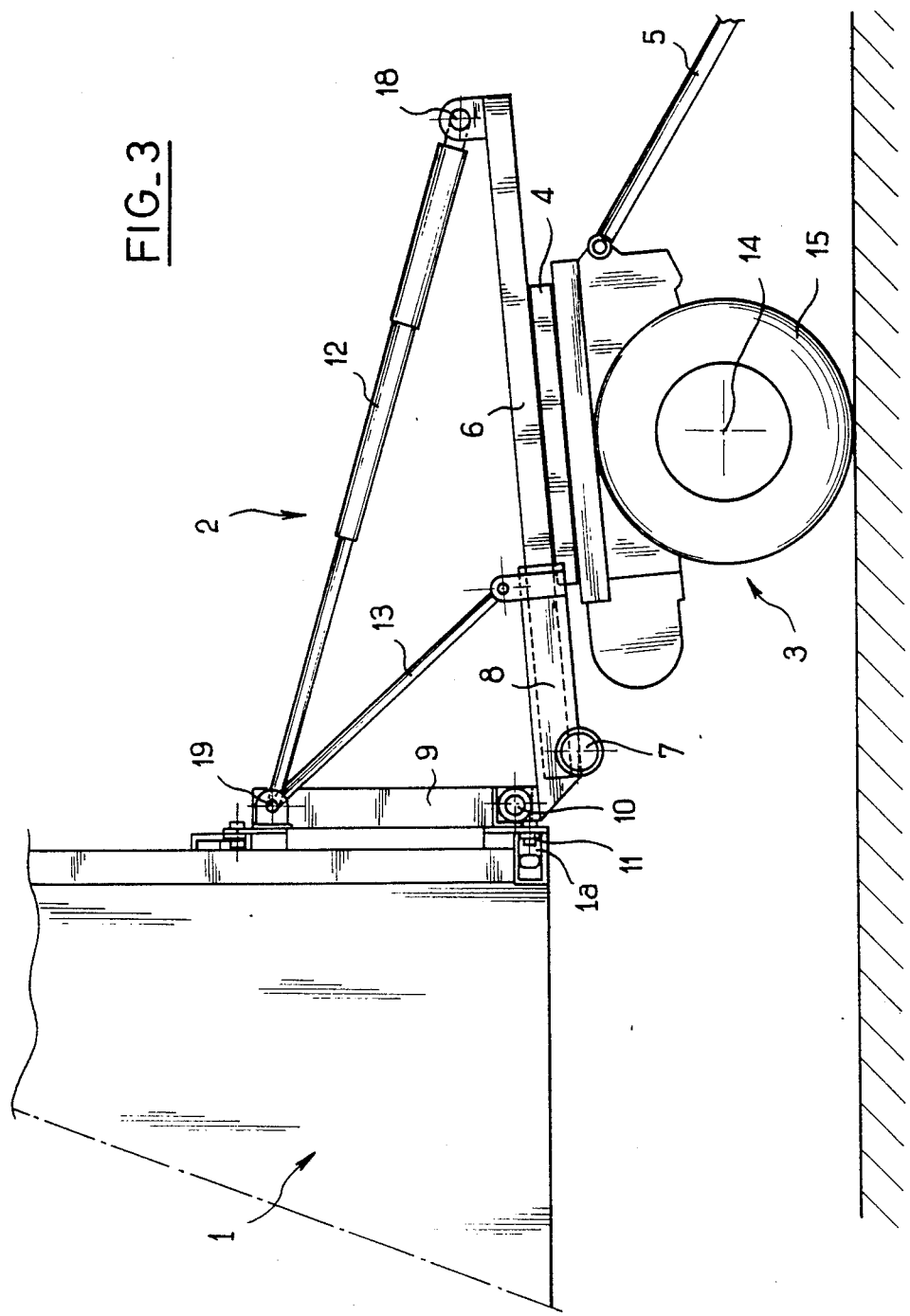

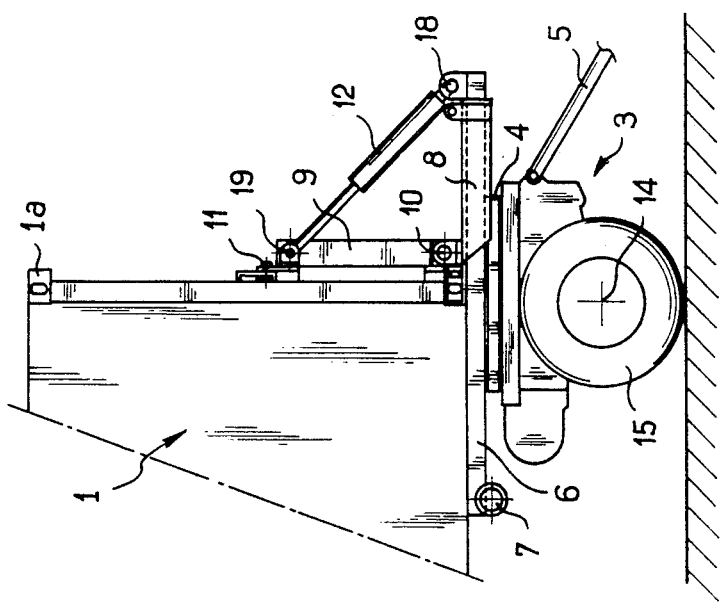
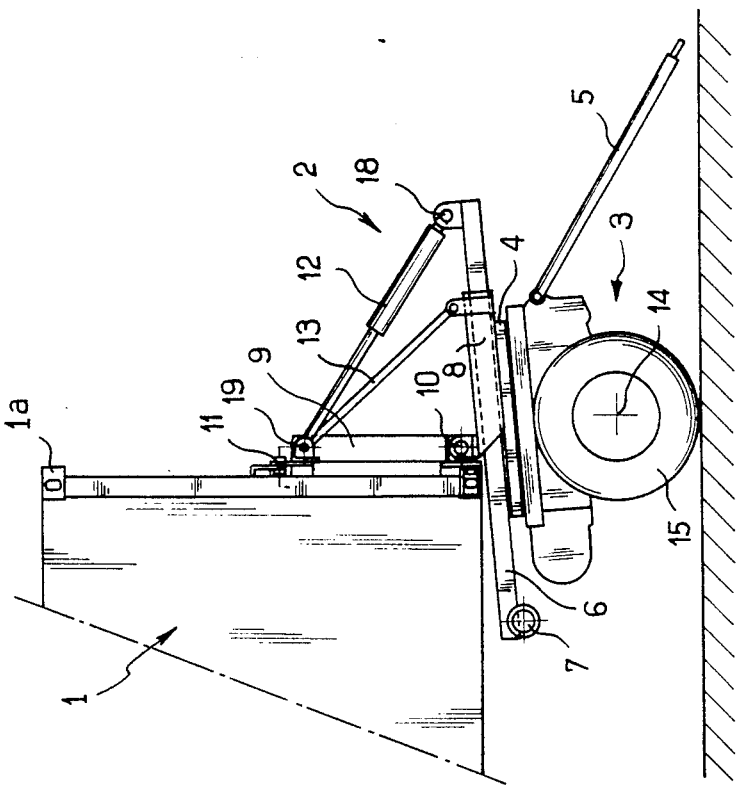

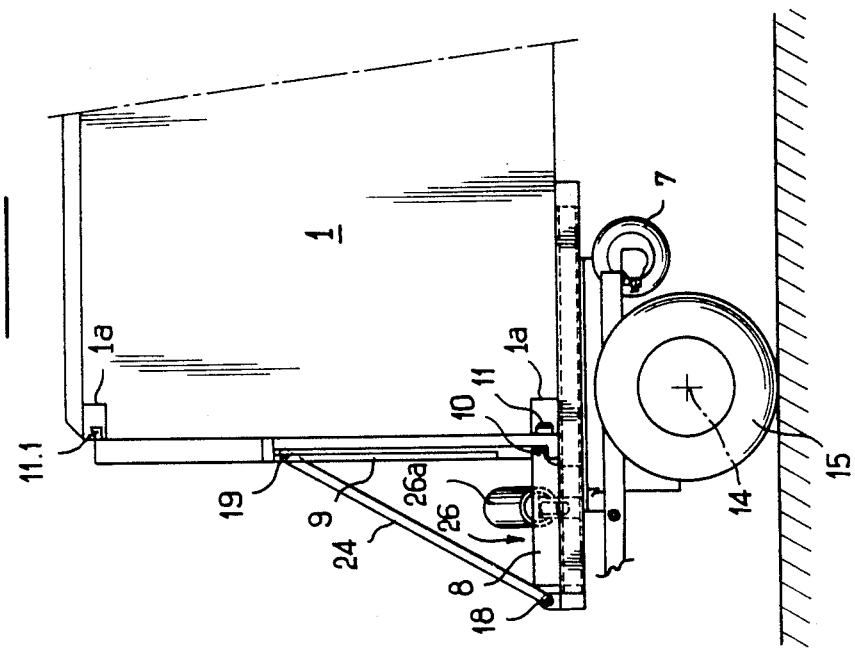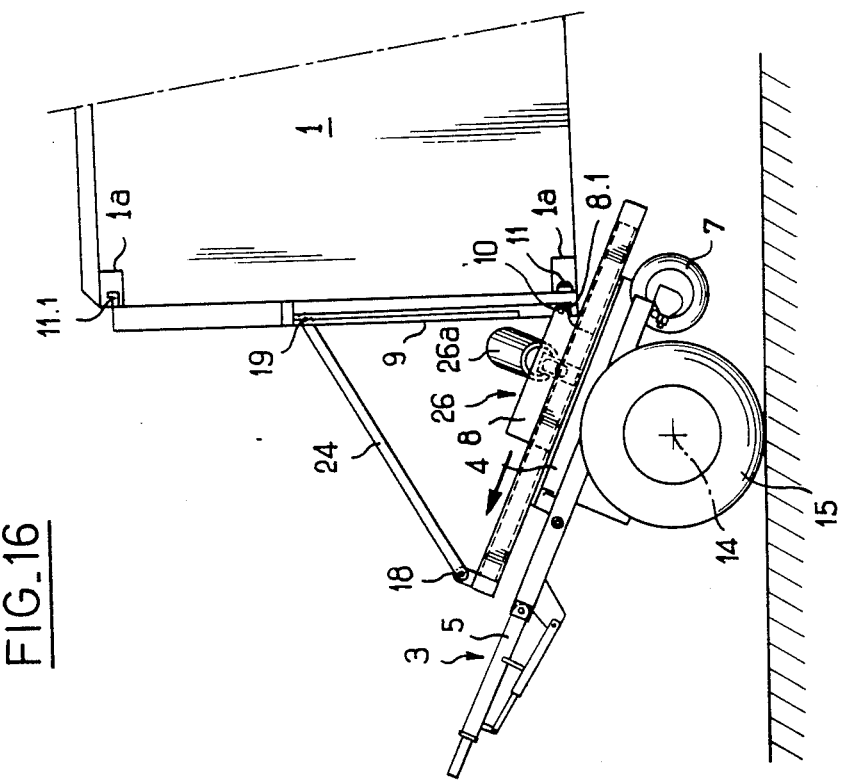

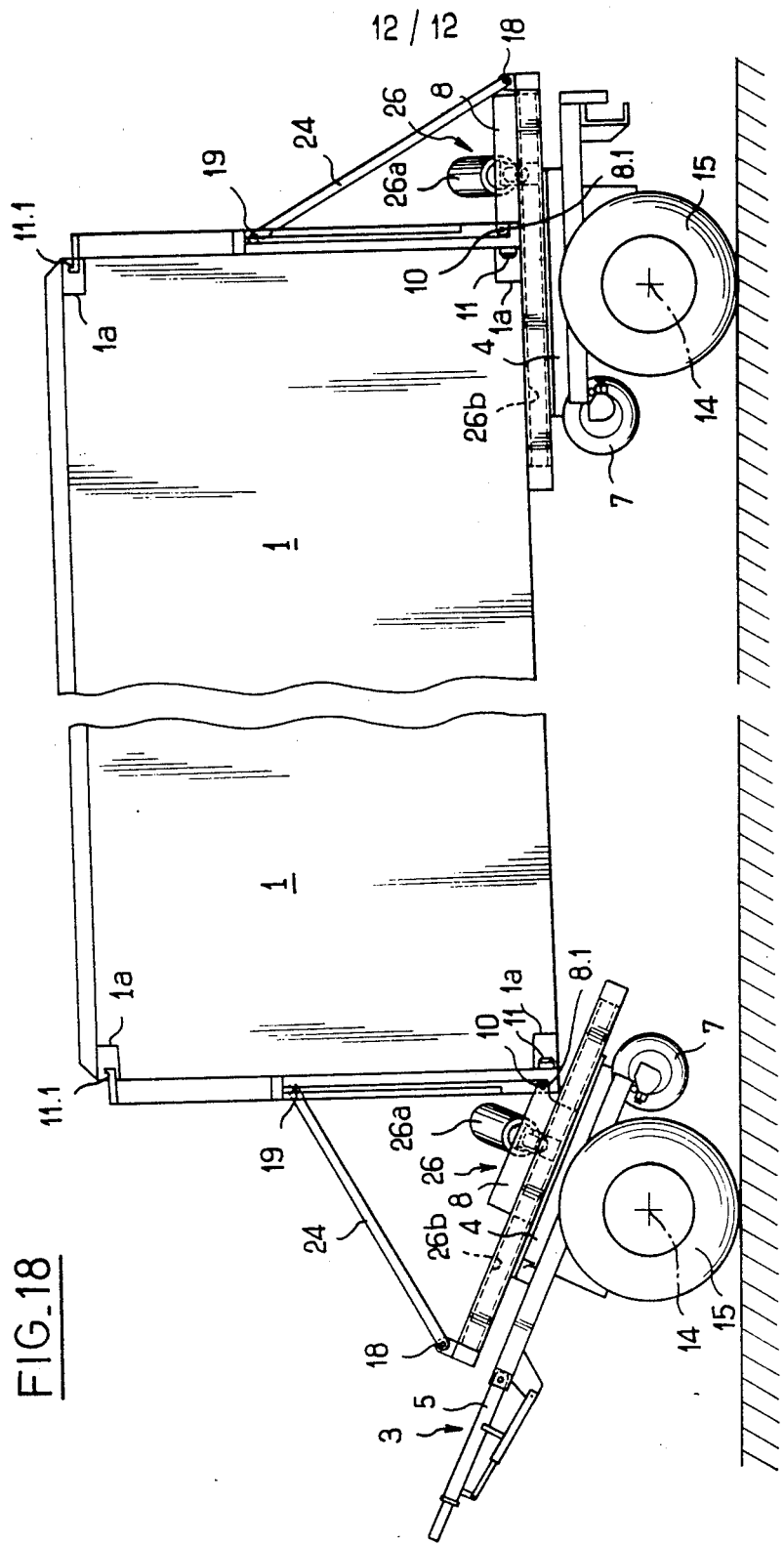

ROLL-ON, ROLL-OFF HANDLING DEVICE AND ELEMENT FOR CONTAINERS OR THE LIKE

This application is a continuation-in-part of U.S. Ser. No. 07/141,362, filed on 12/14/87, which is now U.S. Pat. No. 4,863,334.

The present invention is an improvement to a roll-on, roll-off handling device which is intended to be mounted on wheels and adapted to lift one end of a container and to maintain it in the raised position during displacement or handling of the container.

A known device of this type comprises:

a chassis, an apron provided with means for removable attachment to one face of a container and articulated with respect to the chassis, and means for adjusting the angle between the apron and the chassis.

In this known device, the apron is pivoted to the chassis at one extremity of this latter.

In order to carry out a handling operation, the chassis is inclined in such a manner as to ensure that said extremity is adjacent to the ground, whereupon the apron is attached to the container. After this, the angle between apron and chassis is varied in such a manner is to ensure that the chassis pivots towards the horizontal while the container is lifted. A similar device carries out the same operation at the other end of the container. The container and the two devices now form an assembly adapted for use as a trailor. On the way, the container remains suspended between the two devices each mounted on wheels. This results in the attachment between the container and each apron being subjected to all the stresses of road transport. The container is subjected to high bending stresses. The resultant wheel-base of the rolling unit (distance between the axles from one device to the other) is excessive.

The object of the invention is to improve the known device in order to remove therefrom the disadvantages which have been mentioned in the foregoing.

According to the invention, there is provided a roll-on, roll-off handling device adapted to lift one end of a container and to maintain it in the raised position during handling and displacement of the container, said device comprising:

a chassis;

means for supporting the chassis upon the ground which means permits pivotal movement of said chassis with respect to the ground about a first axis parallel to the ground, said chassis pivoting about the first axis from a tilted position in which a first end of the chassis is adjacent to the ground and a raised position in which said first end is spaced from the ground;

a carriage mounted on said chassis and displaceable along the longitudinal axis of said chassis, said longitudinal axis being transverse to said first axis;

an apron removably attachable to one face of a container, said apron being connected to said carriage and adapted for pivotal movement with respect to both said carriage and said chassis about a second axis substantially parallel to said first axis;

means for pivotally displacing said apron with respect to said chassis about said second axis;

means for moving said carriage and said chassis with respect to each other along the longitudinal axis of said chassis, said carriage being movable between an advanced carriage position in which said second axis is adjacent said first end or the chassis and spaced from said first axis, and a container supporting position in which the second axis is displaced toward an opposed second end of the chassis thereby to allow movement of a container from a position in which said container rests on the ground with the chassis in its tilted position and the carriage in said advanced carriage position, to a position in which, after movement of the chassis to said raised position and of the carriage to its container supporting position, said end of the container is raised and overlies part of the chassis.

Thus, on the way, the chassis is engaged beneath the container with the result that the container rests on the chassis. The container is therefore subjected to distinctly less unfavorable stresses. Moreover, the engagement of the chassis beneath the container at each end of this latter reduces the wheel-base of the assembly and restores it to an acceptable value in regard to the maximum permissible values. The invention thus provides the means of very readily constructing a road-transport unit (which is capable of traveling at speeds of the order of 60 mph) with very simple means which can very easily be put to use with a container which does not require any preliminary arrangement other than the attachment means usually imposed by current standards.

According to a first embodiment of the invention, the means for pivotally displacing the apron With respect to the chassis comprise a jack pivotally attached to the apron at a distance from the second axis and to the chassis at a distance from the first end thereof, and means are provided for selectively locking the apron in position with respect to the carriage against relative pivotal displacement about said second axis whereby activation of the jack entails displacement of the carriage along the chassis when the apron is locked in position with respect to the carriage, whereby the same jack serves to pivot the apron with respect to the chassis and to displace the carriage axially along the chassis, depending on whether locking of the apron with respect to the carriage is achieved or not.

The means for selectively locking the apron with respect to the carriage may comprise at least one removable spacer member for triangulating the apron and the carriage.

Said means for selectively locking the apron are advantageously capable of locking the apron in a position in which the chassis makes an angle of slightly less than 90° with the container face concerned when the apron is attached to this latter.

When the apron is locked in this position, the carriage can be displaced along the chassis in order to engage the chassis beneath the container without producing any friction between chassis and container. At the end of this operation, the apron is again pivoted with respect to the carriage and the chassis so as to abut the chassis against the bottom face of the container, in order to allow the container to rest on the chassis.

Preferably, a caster or the like is mounted on the chassis in the vicinity of the first end thereof, this caster being positioned so as to abut the ground when the chassis is in said tilted position about said first axis.

By virtue of this caster, the device can be moved towards the container while the apron is very close to the ground without any scraping of the chassis onto the ground.

Advantageously, the apron can be fixed in a position in which it is folded-back against the chassis with fixing means which are capable of retaining the chassis in a substantially vertical position against the apron when the apron is attached to a container.

Thus the device is capable of assuming an inactive position in which it is retracted against one face of the container lying on a floor or the ground. This is very convenient within the hold of a freight plane.

In another embodiment, the means for pivotally displacing the apron and the chassis with respect to eachother comprises an apron-actuating jack pivotally attached to the apron at a point spaced from the second axis and to the carriage at a point spaced from the second axis, while the means for moving the carriage and the chassis with respect to each other comprises a carriage actuating jack which extends along said longitudinal axis of the chassis and is capable of adjustably positioning the carriage along the chassis. In this embodiment, there is no longer any removable spacer member to be handled and the efforts of displacement of the carriage are parallel to the direction of this displacement, thus reducing stresses and eliminating problems related to jamming hazards.

The means for supporting the chassis upon the ground may comprise means for pivotally attaching the roll-on, roll-off device to a vehicle.

Alternatively, said means comprise a supporting wheel system, which is preferably directionally orientable (steerable) with respect to the chassis.

If the wheel system of at least one of both devices supporting a container has two parallel axles which are directionally orientable together but directionnally fixed with respect to eachother, the wheel system of both roll-on, roll-off devices can be brought in use to a directional orientation such that the axes of their wheels are parallel to the length of the container in order to displace this latter laterally.

In a prefered embodiment of the invention the means for pivotally displacing the apron with respect to the chassis about the second axis comprises a connecting-rod pivotally connected to the apron remote from said second axis and to the chassis remote from the first end thereof, thereby to pivotally displace said apron with respect to said chassis upon actuation of said means for moving said carriage and said chassis with respect to eachother.

This embodiment allows to perform the whole handling of a container by solely displacing the carriage relative to the chassis, with the connecting-rod always in position. During displacement of the carriage, and thus of the second axis, along the chassis, the connecting-rod correspondingly pivots the apron with respect to the chassis.

Such a displacement may be achieved through various ways: hydraulic jack, rack, endless screw, . . .

Thus, by making use of all or part of the features mentioned above, it is possible by means of two roll-on, roll-off handling devices which may or may not be identical:

to take a container which is resting on the ground,
to lift this latter to approximately 1.6 m above the ground, whether the load is maintained horizontal or not,
to displace the container in all positions of the previous movement, thus making it possible for example to load a military transport plane,
to position the container rapidly and accurately in the three axes on any terrain which is suitable for vehicles,
to place the two roll-on, roll-off handling elements beneath the container so as to constitute a road-vehicle trailer,
to adjust the wheel-base and the position of the axles with a view to ensuring better distribution of loads,
to be drawn or pushed by a vehicle indifferently in one direction or in the other,
to be drawn and pushed jointly by two vehicles, subject to the reservation that one of the two roll-on, roll-off handling elements is twin-axled in order to prevent the center of gravity of the trailer from passing beyond the sustentation polygon thereof,
to draw the devices independently or one behind the other for displacing them when empty,
to place the two roll-on, roll-off handling devices at the end of a container within the volume-equivalent of a 10-foot (1 D.) container or in other words a length of twice five feet,
allow a container to be drawn onto a road-vehicle deck by means of a mini-winch of the road-vehicle and, if needed, of a roller (round tube) interposed between the container and the deck,
to deposit a small container on a large railway flatcar from a loading platform at flatcar level but alongside the railway car.

Further features and advantages of the invention will also be brought out by the non-limitative description given hereinafter.

In the accompanying drawings:

FIGS. 2, 3, 4, 5 and 6 are views which are similar to FIG. 1 but show respectively the coupling of the container, the lifting position, the position of adjustment of wheel-base, the road-transport position and the retracted position;

Figure 1:
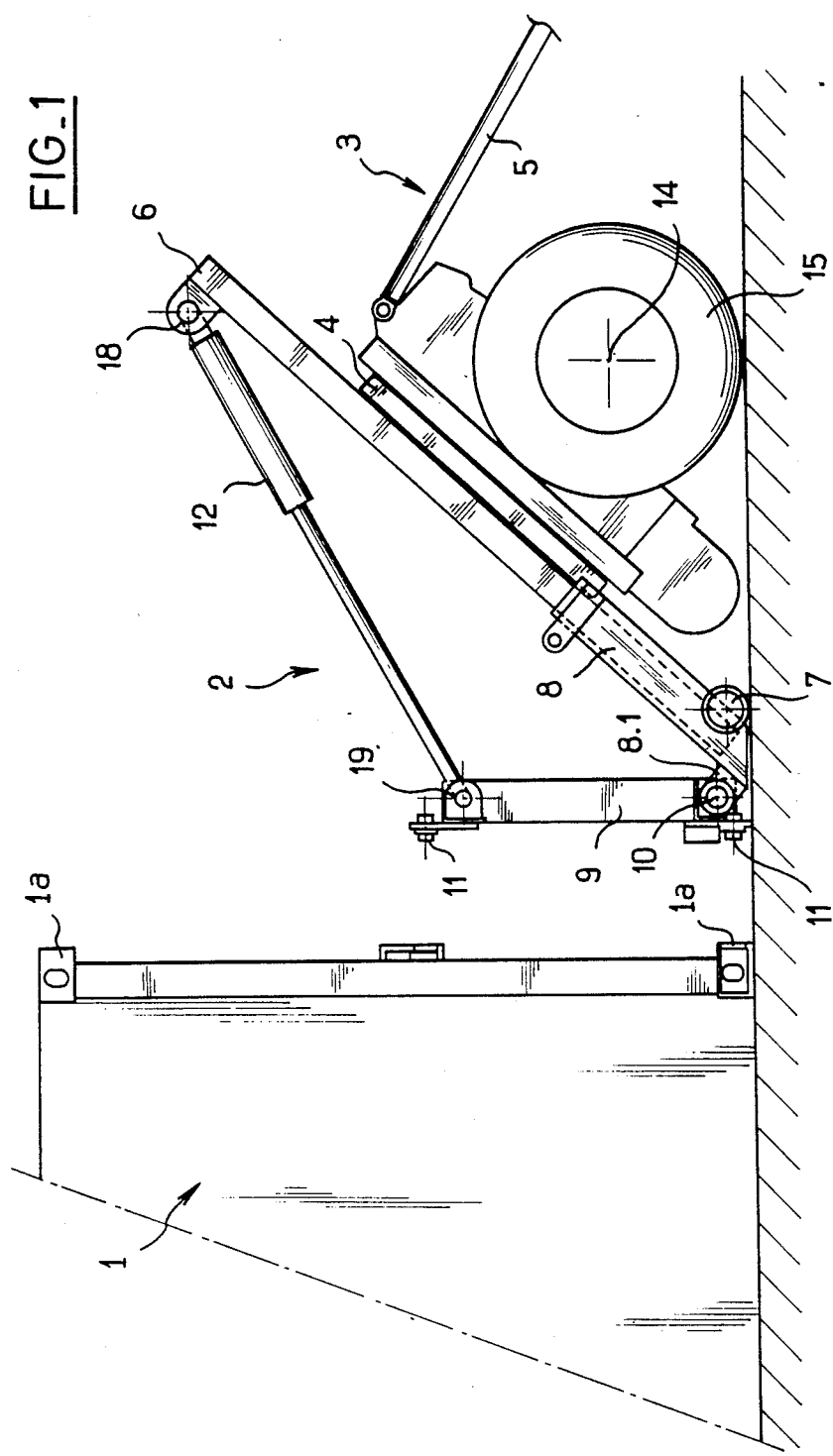
FIG. 1 is a view in elevation of a roll-on, roll-off handling element in the tricycle position, in the course of being moved towards a container.

FIGS. 14—17 are views which are similar to FIGS. 1 and 2, 4 and 5 respectively but relate to a third embodiment of the invention.

FIG. 18 is a view in elevation to a smaller scale showing a container during handling by means of the third embodiment.

With reference to FIGS. 1 to 12, each roll-on, roll-off handling element 2 (FIG. 1) is constituted by a steerable wheel system 3 with total rotation as employed for road transport With or without its brake system, suspension, its drawbar 5 and its lighting system. A ball-mounted turn-table 4 permits directional orientation (steering) of an axle 14 equipped with wheels 15 with respect to a chassis 6 having a length usually smaller than eight feet, equipped with two parallel rails in spaced relation and perpendicular to the axis of the ball-mounted turn-table 4. The rails are parallel to a longitudinal axis of the chassis.

A self-steerable caster 7 mounted beneath a first end of said chassis forms with the two wheels 15 of the axis 14 a tricycle which permits manual approach of each roll-on, roll-off handling device 2 (FIG. 1), the axle 14 being oriented at right angles to the rails of the chassis 6. When the caster 7 engages the ground, the chassis 6 is in an inclined first position which is called hereinafter the tilted position. The chassis may pivot with respect to the ground about a first axis, which is substantially the axis of the wheels 15, up to a raised position (FIG. 5) in which the first end of the chassis and the caster 7 are spaced apart from the ground. Said pivotal displacement of the chassis is available only when the wheel-system is oriented to have the axle 14 being transverse to the longitudinal axis of the chassis. Therefore, the first axis is said to be transverse to the longitudinal axis of the chassis.

A carriage 8 which is slidable along the rails of the chassis 6 is equipped at one of its extremities with brackets 8.1 to which an apron 9 is pivoted about a second horizontal axis 10 which is parallel to the first axis and thus transverse to the rails and to the axis of the ball-mounted turn-table 4.

The apron 9 is constituted by a frame and provided with one or a number of locking-bolts 11 adapted for insertion and attachment within the standardized hole or holes of the front and rear faces of the corner-pieces 1a of the containers 1.

A double acting jack 12 which may be multi-stage if necessary, has a first extremity pivoted to a second end of the chassis 6, remote from the first end 0 thereof, and a second extremity pivoted to the apron 9 about a third pivotal axis 19 which is parallel to the second axis 10 and remote from this latter.

In the empty road-transport position, the apron 9 usually rests on the sliding carriage 8.

The articulations between sliding carriage 8 and apron 9, apron 9 and jack 12, and jack 12 and chassis 6, form the three vertices of a triangle, two sides of which are of variable length by sliding of the carriage on the ramp-chassis and respectively by action of the jack 12.

A connecting-rod 13 (FIGS. 3 and 4) or a pair of articulated extension struts makes it possible to selectively lock the angle made by the apron 9 with respect to the sliding carriage 8, that is to say the angle between the plane in which the apron bears on the container and the direction of the rails of the chassis 6, with the result that this angle will have two privileged values, zero (see FIG. 5) and ninety minus X degrees (0° and 90°—X). As a general rule, X is of the order of 10° or less (see FIG. 3).

Depending on whether the angle between apron 9 and sliding carriage 8 is locked or not, the action of the jack 12 and of gravity displaces the carriage 8 along the chassis 6 or respectively produces a variation in the angle between apron 9 and chassis 6.

Figure 2:
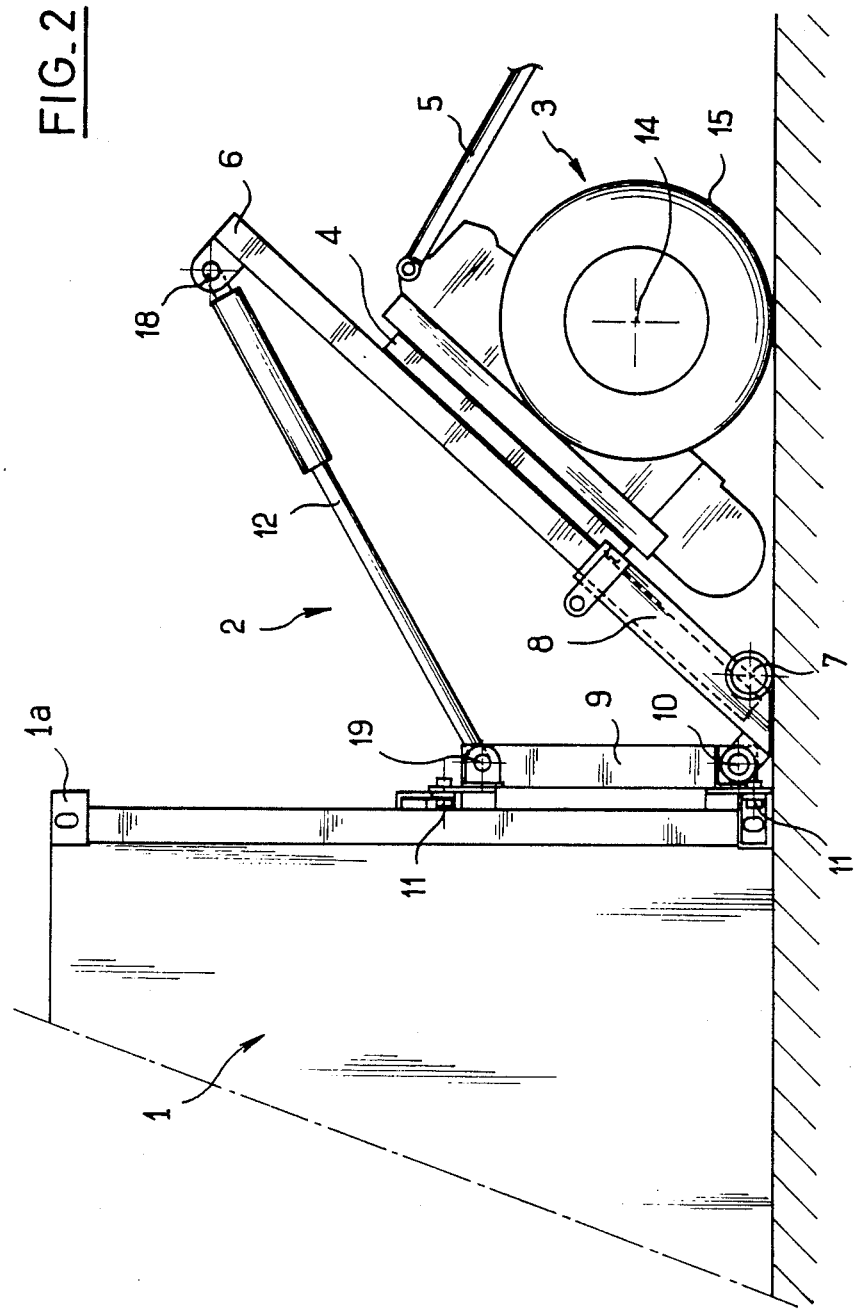

The variation in the angle between apron 9 and chassis 6 produces a variation in the angle between chassis and container 1 and performs a lever action on the container 1 about the first axis (axle 14) (see comparatively FIGS. 2 and 3).

Other systems already utilize said lever effect for lifting the container 1. However, the invention moreover allows to slide the roll-on, roll-off handling device 2 beneath the container 1. This is possible by means of the following operation:

when the angle of 90°—X has been reached, the angle locking connecting-rod 13 is placed in position (FIG. 3), thereby to provide a rigid assembly made of the carriage, the apron and the connecting-rod, the action of the jack 12 is then reversed, thereby causing the chassis 6 to slide with respect to said rigid assembly secured to the container (FIGS. 4 and 5), said sliding causes the roll-on, roll-off handling device to slide beneath the container 1 while the wheels 15 roll on on the ground.

Progressively as the axis of axle 14 reaches vertical alignment with the end face of the container and said rigid assembly, the compressive forces undergone by the connecting-rod 13 decrease to zero, then change-over to extension forces which become progressively larger as the carriage 8 reaches successive positions past the axis of the ball-mounted turn-table 4 (FIG. 4).

When the carriage 8 is reached by an end-of-travel stop of the chassis 6, the jack 12 which is still undergoing a movement of withdrawal cancels the extension forces undergone by the connecting-rod 13.

It is then possible to remove the connecting-rod 13 before fully releasing the pressure within the jack 12 and suppressing its tractive force on the apron 9. The container 1 comes to rest on the roll-on, roll-off handling device 2, especially on the chassis thereof (FIG. 5).

In order to prevent any error of operation, a means locking the carriage 8 against sliding motion is automatically enabled upon said removing of the connecting-rod 13.

Since the carriage 8 now rests on the chassis 6 past the first axis (past axle 14), the weight of the container has now on the chassis a torque about the first axis in the direction applying the chassis 6 beneath the container 1. The container 1 thus rests on the chassis and is locked on the roll-on, roll-off handling device 2.

Figure 7:
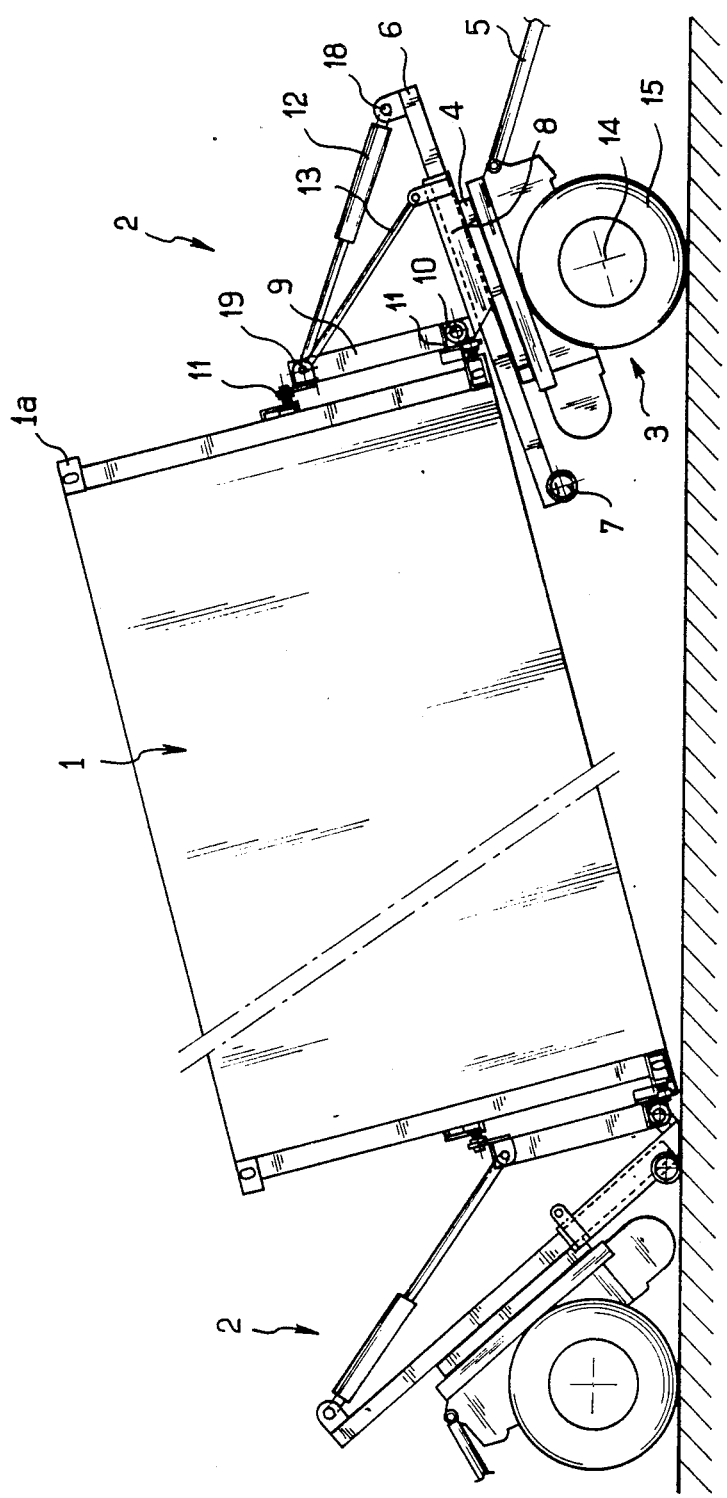
FIG. 7 is a view in elevation to a smaller scale during handling.
Figure 8:
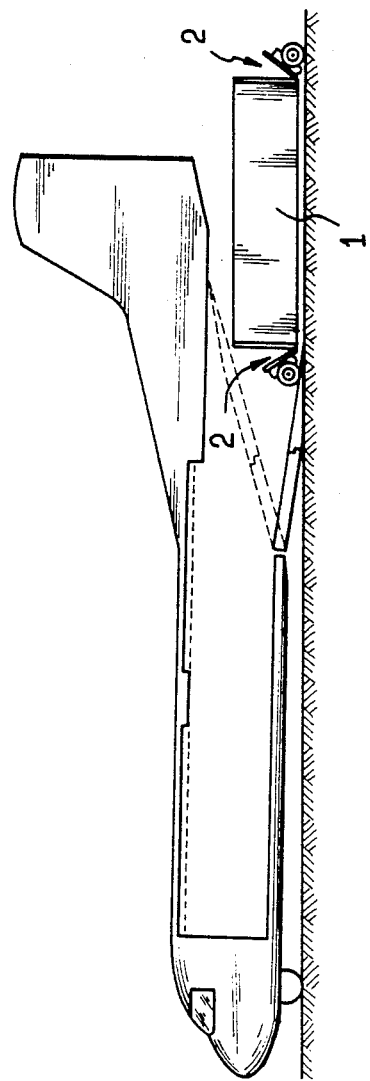
FIGS. 8 to 12 show the five steps of loading of a container on board an aircraft.
Figure 9:
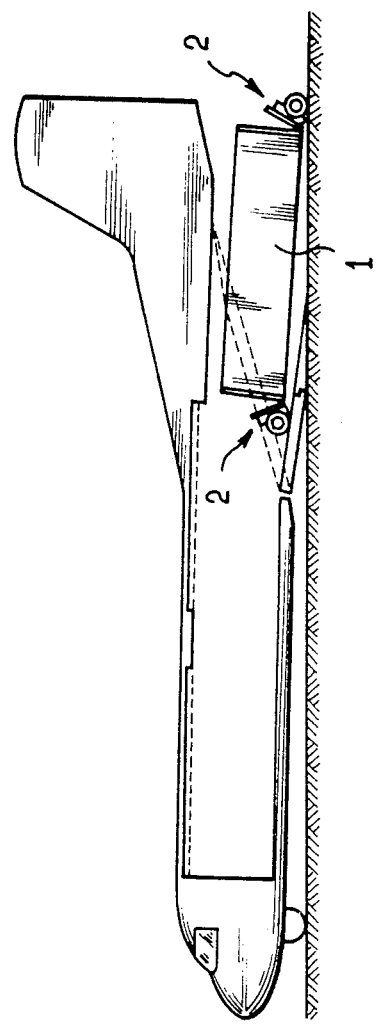
Figure 10:
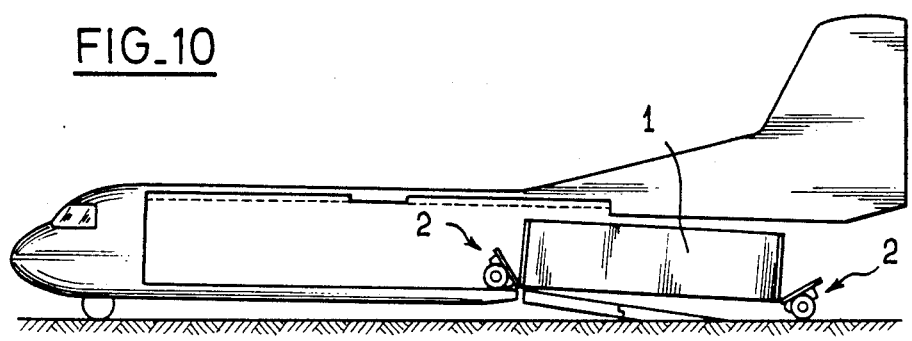
Figure 11:
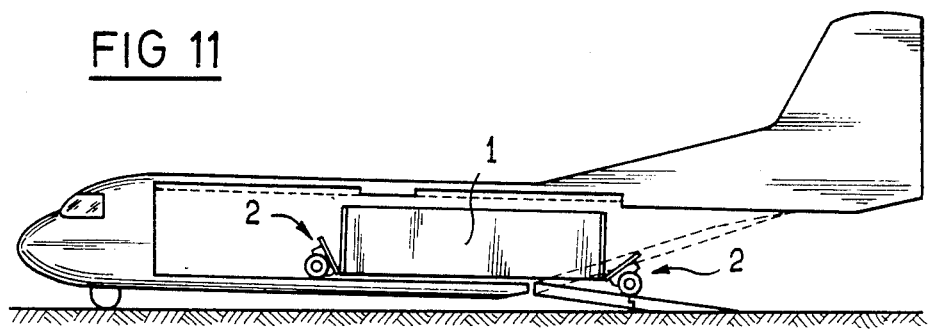
Figure 12:
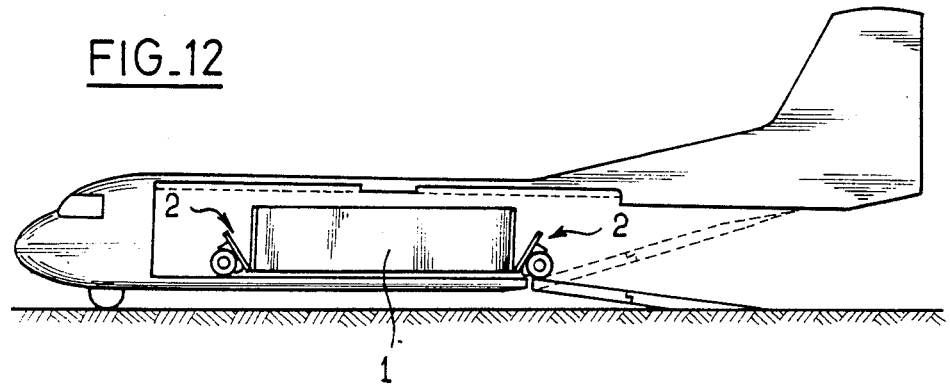

Independantly from the foregoing or in conjunction therewith, the same steps are performed with the other roll-on, roll-off handling device 2 at the other end of the container (FIG. 7).

Depositing of the container on the around is obtained by performing the reverse process with respect to that described.

A system of piping and electric wiring serves to connect the roll-on, roll-off handling devices 2 internally or externally to each other and to the tractor.

As shown in FIGS. 8 to 12, in order to load a container on board a freight plane having a cargo hatch which makes a significant angle with the cargo-space floor, the roll-on, roll-off handling devices are placed in the hoisting position and, by means of the jack 12, the height of each extremity of the container is so adjusted as to take into account as far as possible the requirements of ground clearance and available height.

Figure 6:
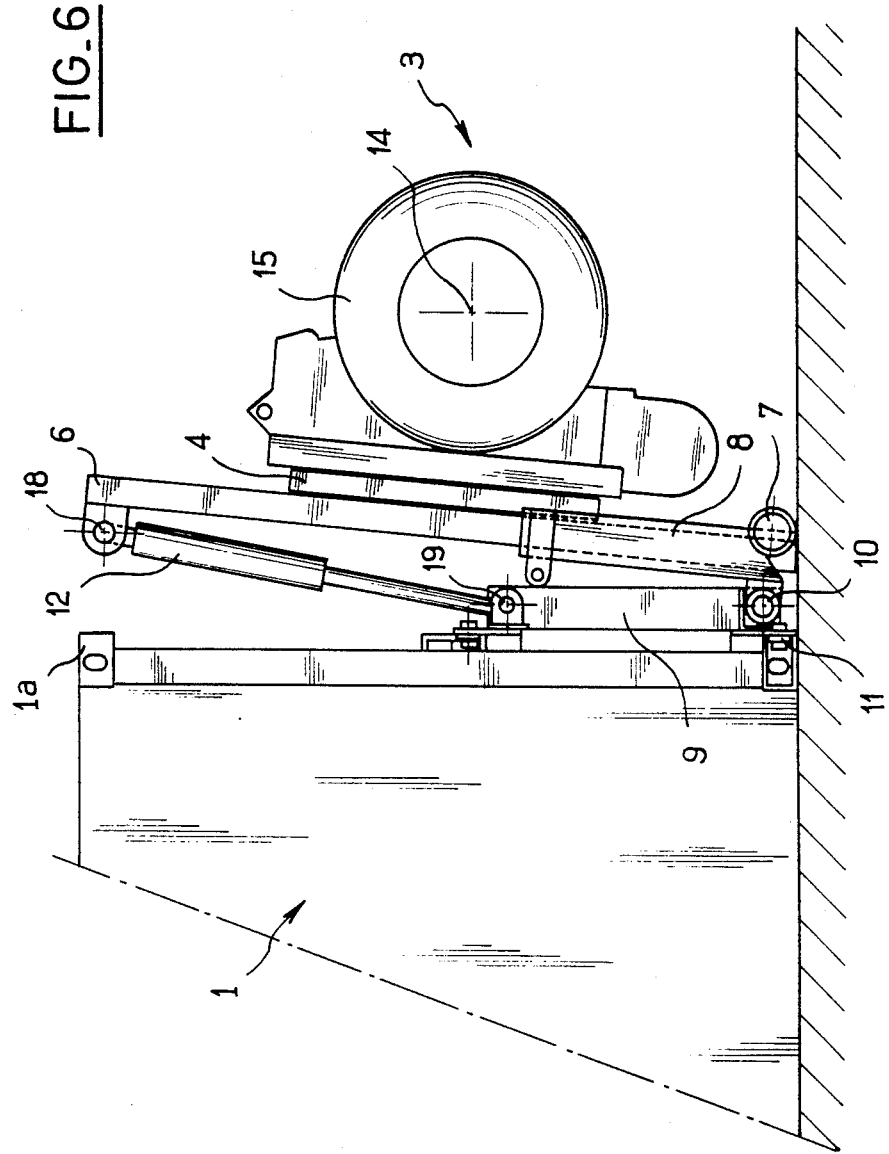

The devices in accordance with the invention also permit loading of a container onto a low truck-van deck. One of the devices being initially retracted at one end of the container (as shown in FIG. 6), the deck is backed-up to the container. Action on the jack serves to bring the wheels of the device to bear on the deck. The device is held in a fixed position on the deck by means of the winch which is usually provided on the deck. The rear device, then the front device are placed in the hoisting position. By means of the winch, the complete assembly is drawn onto the platform (deck) while the front device rolls on the platform and the rear device rolls on the ground. If the platform is of substantial length, a roller or rolling tube is placed between container and platform in order to complete the forward displacement on the platform whilst the rear device is retracted.

The embodiment shown in FIG. 13 again shows all the elements of the first embodiment except for the jack 12 and the connecting-rod 13. A double-acting jack 23 is pivoted to the apron 9 about the axis 19 and to the carriage 8 about an axis parallel to the second axis 10 and located at a distance from this latter towards the second end of the chassis 6. In short, the jack 23 is permanently mounted at the location in which the connecting-rod 13 was selectively mounted in the preceding embodiment. By "permanently" is meant "without any need for disassembly during use".

Moreover, the carriage 8 carries a stationarily fixed nut 21 having a screw-thread engaged by a screw 20 rotatably carried by the chassis 6. The screw 20 is parallel to the rails and extends substantially over the entire length of the chassis. A hand crank 22 serves to rotate the screw 20 in order to displace the carriage 8 along the chassis 6.

The device 2 thus constituted is used as follows:

At the outset (FIG. 13), the carriage 8 is in the advanced carriage position, i.e. the end position nearest the caster 7, and the jack 23 sets the angle between apron 11 and carriage 8 at approximately 45°. Once the locking-bolts 11 are in position within the corner-pieces 1a of the container 1, the jack 23 is actuated in a movement of extension until the aforementioned angle is 90°—X. The hand crank 22 is then actuated so as to displace the carriage 8 towards its other end position while the jack 23 locks the angle. Finally, the action of the jack 23 is stopped in order to allow the load to rest on the chassis as explained earlier in connection with the preceding embodiment This embodiment does not permit the retracted position of FIG. 6. On the other hand, its construction is advantageous since the screw 20 urges the carriage 8 in the direction of displacement, therefore without any risk of jamming, with the result that the carriage B is capable of resting on rails without any problem by means of shoes of large size rather than by means of rollers. Accordingly, the chassis which is no longer subjected to any localized stress either by the carriage or by the jack 12 of FIGS. 1 to 4 can be considerably reduced in weight.

Figure 13:
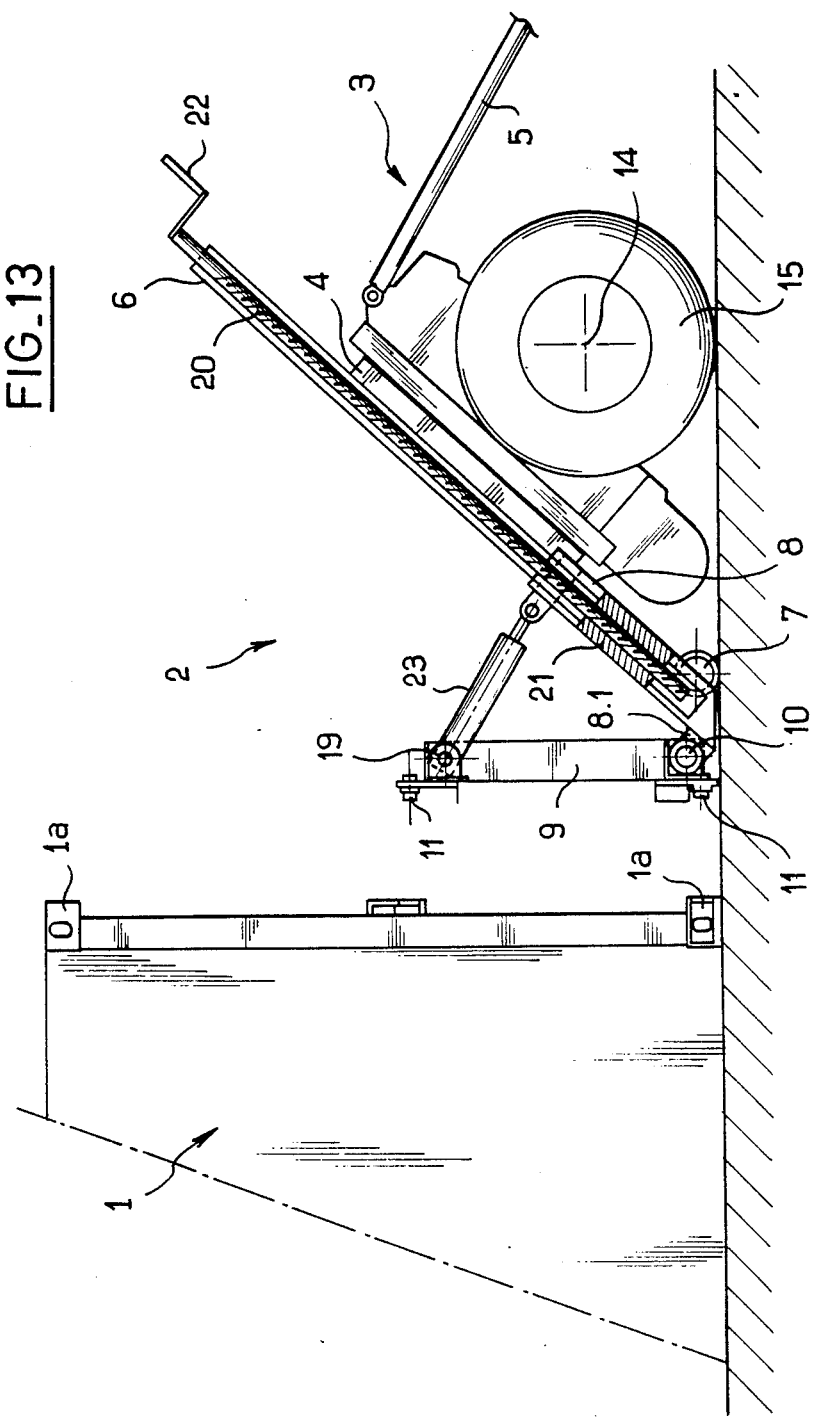
FIG. 13 is a view which is similar to FIG. 1 but relates to a second embodiment.
Figure 14:
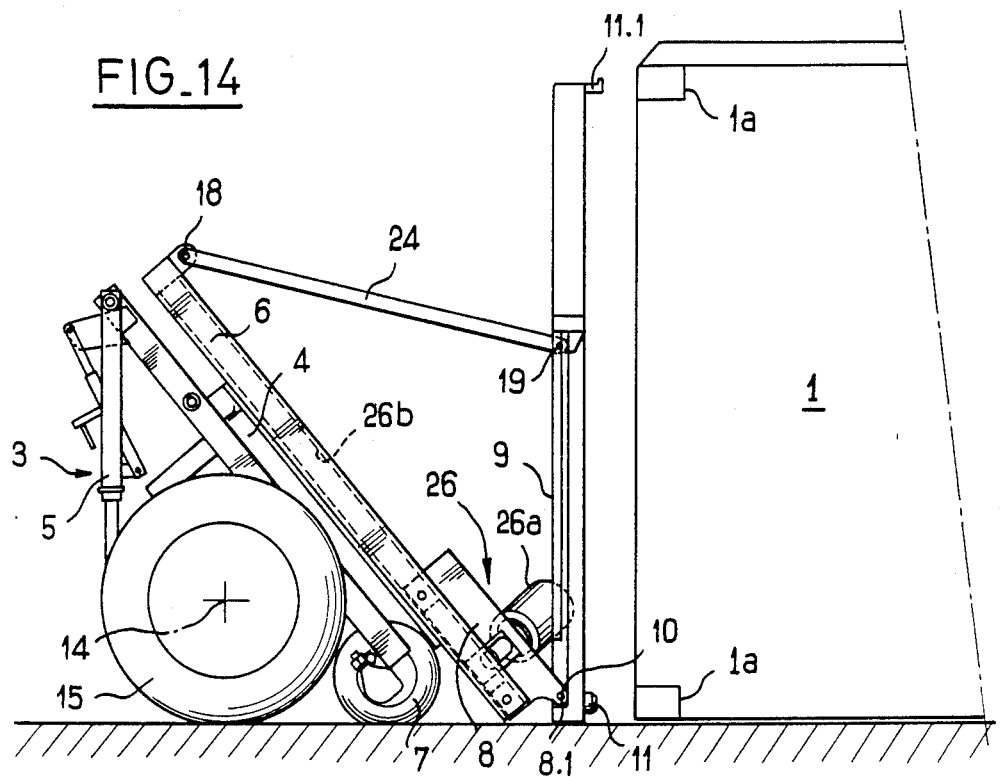

FIGS. 14 to 18 show a third, prefered embodiment of the invention and the method of handling a container therewith. This embodiment will be described only as to its differences with respect to the second embodiment (FIG. 13). The jack 23 is replaced by a connecting-rod 24 pivotally connected to the apron 9 at axis 19 remote from the second axis 10 and to the chassis 6 at axis 18 adjacent the second end of chassis 6. Moreover, the carriage driving screw 20 is replaced by carriage driving means 26 in the form of a jack 26b (shown schematically) extending longitudinally of chassis 6 between the carriage 8 and the second end 18 of the chassis 6. A pressure source 26a is adaped to be releasably connected to the jack 26b for actuating the latter when desired. The pressure source 26a may be a hand-operated pump.

According to this embodiment, there is a permanent triangulation which is achieved by the connecting-rod 24, the chassis 6 and the apron 9.

Figure 15:
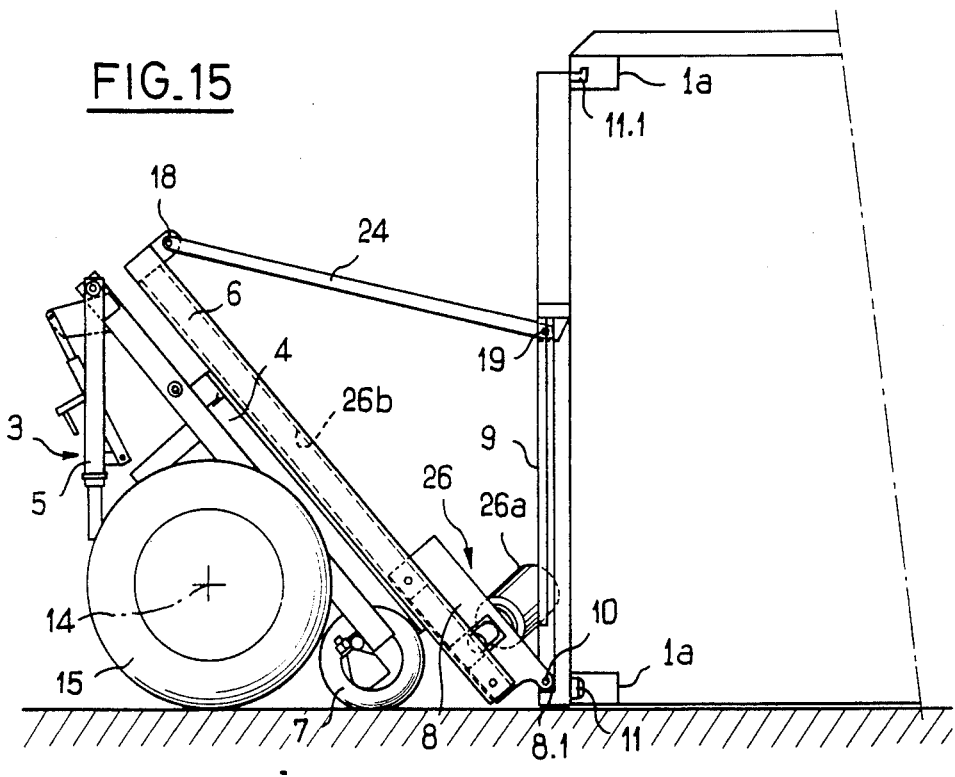

In use, the apron 9 of the device is first coupled to the container 1 lying on the ground (FIG. 15). The chassis 6 is in the tilted position. The carriage 8 is in the advanced carriage position whereby, due to the length of the connecting-rod 24, the apron is at an angle of approximately 90° to the ground and 45° to the chassis 6.

The motor means 26 are then actuated to move the carriage 8 along the chassis 6 towards the second end thereof. As shown in FIG. 17, due to the connecting-rod having a predetermined length and the apron 9 being secured to the container, movement of the carriage with respect to the chassis causes sliding of the chassis 6 underneath the container and pivotal displacement of the chassis 6 about the first axis (axis of the wheels 15), unil the situation shown in FIG. 17 is reached, i.e. until the apron reaches a position past the first axis whereby the weight of the container produces on the chassis about the first axis a torque urging the chassis into engagement against the bottom face of the container.

The motor means 26 of FIGS. 14–18 could be replaced by the motor means of FIG. 13 (screw, nut and hand-crank), and conversely the motor means of FIG. 13 could be replaced by those of FIGS. 14–18.

I claim:

1. A roll-on, roll-off handling device adapted to lift one end of a container and to maintain it in the raised position during handling and displacement of the container, said device comprising:

a chassis;

means for supporting the chassis upon the ground, which means permits pivotal movement of said chassis with respect to the ground about a first axis parallel to the ground, said chassis pivoting about the first axis from a tilted position in which a first end of the chassis is adjacent to the ground and a raised position in which said first end is spaced from the ground;

a carriage mounted on said chassis and displaceable along the longitudinal axis of said chassis, said longitudinal axis being transverse to said first axis;

an apron removably attachable to one face of a container, said apron being connected to said carriage adapted for pivotal movement with respect to both said carriage and said chassis about a second axis substantially parallel to said first axis;

means for pivotally displacing said apron with respect to said chassis about said second axis;

means for moving said carriage and said chassis respect to each other along the longitudinal axis of said chassis, said carriage being movable between an advanced carriage position in which said second axis is adjacent said first end of the chassis and spaced from said first axis, and a container supporting position in which the second axis is displaced toward an opposed second end of the chassis, thereby to allow movement of a container from a position in which said container rests on the ground with the chassis in its tilted position and the carriage in said advanced carriage position, to a position in which, after movement of the chassis to said raised position and of the carriage to its container supporting position, said end of the container is raised and overlies part of the chassis; wherein the means for pivotally displacing said apron with respect to said chassis about said second axis comprises a connecting rod pivotally connected to the apron remote from said second axis and to the chassis remote from said first end, thereby to pivotally displace said apron with respect to said chassis upon actuation of said means for moving said carriage and said chassis with respect to each other.

2. A device in accordance with claim 1, comprising a caster mounted on the chassis in the vicinity of said first end of said chassis, this caster being potisioned so as to abut the ground when the chassis is in said tilted position about said first axis.

3. A device in accordance with claim 1, wherein said means for supporting said chassis upon the ground comprises a supporting wheel system.

4. A device in accordance with claim 3, wherein the wheel system is directionally orientable with respect to the chassis.

5. A roll-on, roll-off handling device according to claim 1, wherein the means for moving said carriage and said chassis with respect to eachother comprise a jack extending longitudinally of the chassis between said carriage and said second end of the chassis.

* * * * *